(12) United States Patent
Liu (10) Patent No.: US 7,602,711 B2
(45) Date of Patent: Oct. 13, 2009

(54) METHOD AND SYSTEM FOR RESOURCE RESERVATION IN CUSTOMER REQUEST MODE IN NEXT GENERATION NETWORK, AND AN RM-PDF THEREOF

(75) Inventor: Enhui Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 236 days.

(21) Appl. No.: 11/681,641

(22) Filed: Mar. 2, 2007

(65) Prior Publication Data
US 2007/0189274 A1  Aug. 16, 2007

Related U.S. Application Data

(63) Continuation of application No. PCT/CN2006/000293, filed on Feb. 28, 2006.

(30) Foreign Application Priority Data

Mar. 8, 2005  (CN)  .................. 2005 1 0053506
Jul. 5, 2006  (KR)  ............... 10-2006-0063134

(51) Int. Cl.
H04L 12/56 (2006.01)
(52) U.S. Cl. .................. 370/230; 370/229; 370/401
(58) Field of Classification Search .......... 370/229, 370/230
See application file for complete search history.

(56) References Cited

U.S. PATENT DOCUMENTS 6,330,561 B1 * 12/2001 Cohen et al. ................. 707/10
6,910,074 B1 * 6/2005 Amin et al. .................. 709/227
7,209,439 B2 * 4/2007 Rawlins et al. .............. 370/230
7,391,724 B2 * 6/2008 Alakoski et al. ............. 370/230
2002/0007398 A1  1/2002 Mendiola et al. ............ 718/104
2005/0015503 A1  1/2005 Edwiges et al. ............. 709/228
2006/0171315 A1 * 8/2006 Choi et al. ................... 370/230
2007/0053363 A1 * 3/2007 Chen et al. ............. 370/395.21
2007/0054676 A1 * 3/2007 Duan et al. ............... 455/456.2
2008/0004027 A1 * 1/2008 Chen et al. ................... 455/445

FOREIGN PATENT DOCUMENTS

WO  WO-2005/018254  2/2005

OTHER PUBLICATIONS

ETSI, "NGN Functional Architecture; Resource and Admission Control Subsystem (RACS); Release 1," ETSI ES 2XX XXX V<1.1.0> (2004).

(Continued)

*Primary Examiner*—Ricky Ngo
*Assistant Examiner*—Rasheed Gidado
(74) *Attorney, Agent, or Firm*—Marshall, Gerstein & Borun LLP (57) ABSTRACT

A resource reservation method in customer request mode in Next Generation Network (NGN) includes: a Resource Mediation Policy Decision Function (RM-PDF) receives a resource request containing resource request parameters through a Border Gateway Function (BGF); the RM-PDF sends an admission installation instruction to the BGF to set admission decision parameters in the BGF for implementing resource reservation when the resource request complies with a customer configuration and network operation policy rules and there is available resource required by the resource request in a transmission network. An NGN Resource and Admission Control System (RACS) supporting resource reservation in customer request mode, and an RM-PDF thereof are also disclosed.

21 Claims, 7 Drawing Sheets

OTHER PUBLICATIONS

Huawei Technologies Co., et al., "Proposal of the Generic RACS Functional Architecture" ETSI TISP AN#04 (2004).
International Telecommunication Union, "Focus Group on Next Generation Networks," Telecommunication Standardization Sector (2004).
Prior et al., "Heterogeneous Signaling Framework for End-to-End QoS Support in Next Generation Networks," Proceedings of the 38$^{th}$ Hawaii International Conference on System Sciences (2005).
Supplemental European Search Report for Application No. 06721988.1-1249, dated Jan. 14, 2008.
International Preliminary Report on Patentability for International Application No. PCT/CN2006/000293, dated Sep. 11, 2007.
International Search Report for International Application No. PCT/CN2006/000293, dated Jun. 15, 2006.
Written Opinion for International Application No. PCT/CN2006/000293, dated Jun. 15, 2006.

* cited by examiner

Fig.1

Prior Art

Fig.2

Prior Art

METHOD AND SYSTEM FOR RESOURCE RESERVATION IN CUSTOMER REQUEST MODE IN NEXT GENERATION NETWORK, AND AN RM-PDF THEREOF

CROSS-REFERENCES TO RELATED APPLICATIONS

This is a continuation of International Application No. PCT/CN2006/000293 filed Feb. 28, 2006, which claims the benefit of Chinese Patent Application No. 200510053506.X, filed Mar. 8, 2005, the entire respective disclosures of which are hereby incorporated herein by reference.

BACKGROUND OF THE INVENTION

1. Field of the Invention

The invention relates to network communication technology, and particularly, to a method for resource reservation in customer request mode in Next Generation Network, and a Next Generation Network (NGN) Resource and Admission Control System (RACS) supporting resource reservation in customer request mode, and a Resource Mediation Policy Decision Function (RM-PDF) thereof.

2. Background of the Invention

In an NGN, packet technologies, such as Internet Protocol (IP) packet, are adopted as bearer network technologies to integrate fixed communication and mobile communication. So an NGN is an integrated network which bears multiple telecommunication services including voice, graphic and data services through IP connectivity among communication entities. Though the NGN has already been brought into the phase of deployment, perfect solutions are still expected to solve the problems in Quality of Service (QoS), security, reliability, operability and manageability in networks over IP.

Two international standard organizations, International Telecommunication Union (ITU-T) and European Telecommunication Standard Institute (ETSI) have established research teams to work on NGN standards. Currently they are working on the frameworks of the NGN. However, it has been a common understanding of the most mainstream operators and equipment providers that an RACS should be adopted to solve the problems concerning QoS, network address translation (NAT) and firewall traversal in an NGN bearer network.

Although the RACS drafts of the two organizations cover different scopes, i.e. the ITU-T Focus Group on Next Generation Networks (FGNGN) takes core network packet transport as well as access network packet transport into consideration, the frameworks produced by the two organizations are similar and compatible with each other. Both organizations have adopted the idea of admission control at network edges according to operation policy rules in the 3GPP policy decision function (PDF) and PacketCable Gate Controller (GC); they have both added network internal resource availability check result as one of admission control criteria to avoid unacceptable congestion, delay or packet loss in application layer. The unacceptable congestion, delay or packet loss result from the level requirements of the traffic flow and service quality exceeding the network bearer capabilities; they have both enhanced NAT and firewall traversal control and they have both taken the support to various NGN multimedia services into consideration.

Currently the framework definitions in RACS drafts are basically fixed and the RACS function framework needs to support multiple resource reservation modes. There are three major resource reservation modes currently.

(1) Proxy Request Mode

A piece of service control equipment initiates a resource request to the resource and admission control layer on behalf of a customer; the piece of service control equipment extracts the bandwidth and service level requirements of the session media stream specified from a customer service request signaling, or determines the bandwidth and service level requirements of a session media stream according to service layer operation policy rules (such as service type and coding/decoding type etc.).

(2) Customer Request Mode

A piece of customer premise equipment (CPE) directly initiates a resource request to a network through dedicated path coupled signaling; the resource request can be initiated it connection with a session or be independent of the session; the resource request may be authorized or unauthorized by a piece of service control equipment in advance.

(3) Access Configuration Mode

A piece of network access management equipment initiates a resource request to a network according to the customer service level agreement information in a customer configuration file when the customer accesses the network; the resource request is at the customer level and independent of the session.

Figure 1:
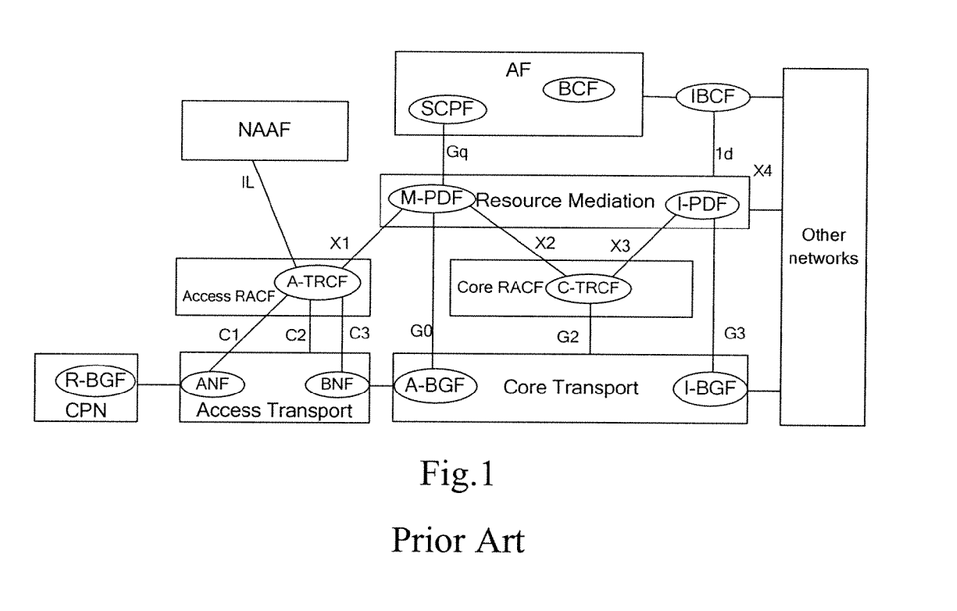
FIG. 1 is a schematic illustrating the RACS system architecture provided by ITU-T FGNGN.

In the latest RACS draft released by ITU-T FGNGN in December 2004, an RACS function framework architecture was provided, as shown in FIG. 1. The RACS function framework architecture includes the following functions.

Application Functions (AF), which are service layer functions used for requesting resource reservation and release from the resource and admission control system for an application media stream, for example a service control proxy function (SCPF) and an interconnection border control function (IBCF).

Network Access Attachment Function (NAAF), which includes functions related to network access management control, and is in charge of network access authentication, authorization and dynamic IP address allocation for customer equipment, access equipment configuration and storage of the customer configuration file, etc.

Resource Mediation (RM) functions, which receive resource reservation requests, determines whether a resource reservation request complies with operation policy rules, and interact with related functions to determine whether a resource reservation request complies with the customer configuration information stored in a customer configuration database and whether there is idle transport resource available which meets the requirements in the network, and make admission decision according to determination results; the resource mediator functions include a mediation policy decision function (M-PDF) on the service access side and an interconnection policy decision function (I-PDF) on the service interconnection side.

Transport Resource Control Functions (TRCF), which receive a resource request from resource mediators, determine whether there is idle transport resource available that meets the requirements of the resource request in the network according to the network topology and resource state data collected and maintained, and control QoS guarantee related forward action of transport equipment in the network; when there are multiple TRCF in a network, the multiple TRCF communicate with each other to check the resource availability of the whole network from the entrance edge to the exit edge; the TRCF includes an Access-Transport Resource Control Function (A-TRCF) in the access network and a Core-Transport Resource Control Function (C-TRCF) in the core network.

Border Gateway Function (BGF) in core network, which receives, stores and enforces admission decision parameters from resource and admission control layer, and further performs message filtering, traffic classification, labeling, monitoring and trimming according to the parameters, and, possibly performs network address conversion and security check filtering of messages.

In this draft, though the descriptions of functions and interface requirements are developed around proxy request mode, complete interface requirements and relevant workflows, used for reserving resources in proxy request mode, are not provided. Moreover, even though support to customer request mode is stated in the general requirements of the draft, technical solutions for resource reservation in customer request mode are provided in none of the chapters of functions, interface requirements and workflows.

Figure 2:
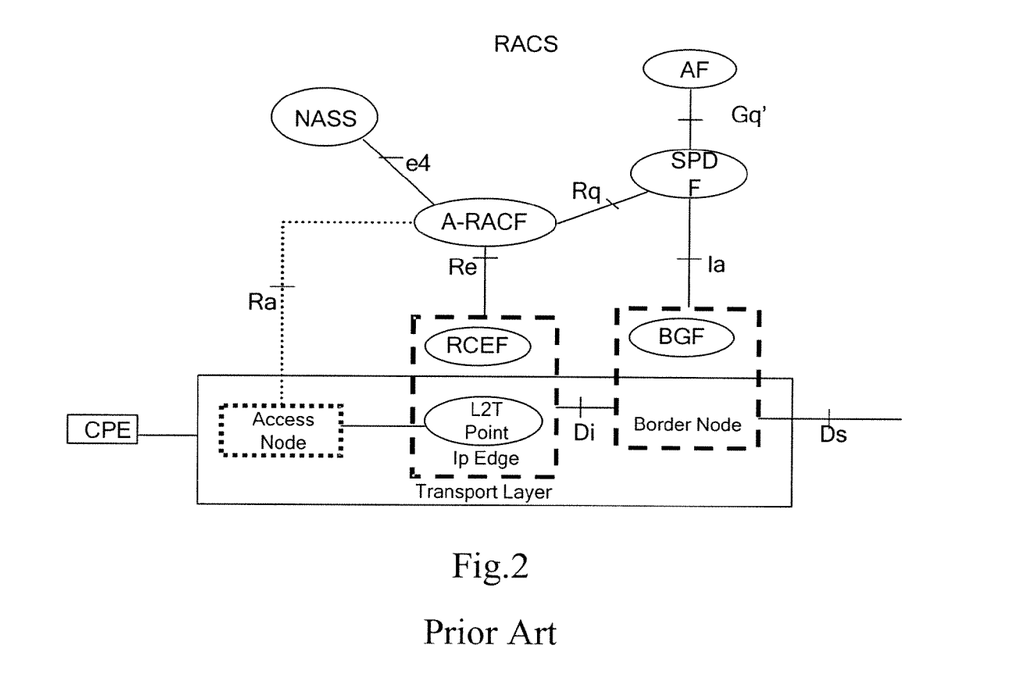
FIG. 2 is a schematic illustrating the RACS system architecture provided by ETSI TISPAN.

In the latest RACS draft released by ETSI TISPAN in January 2005, an RACS function framework architecture is also provided, as shown in FIG. 2, the RACS function framework architecture includes the following functions.

AF, which are service layer functions used for requesting resource reservation and release from the resource and admission control system for an application media stream.

Network Attachment Subsystem (NASS), which is in charge of functions related to network access management control, such as network access authentication, authorization and dynamic IP address allocation for customer equipment, access equipment configuration and storage of the customer configuration file, etc.

Service Policy Decision Function (SPDF), which receives a resource reservation request, determines whether the resource reservation request complies with operation policy rules, interacts with A-RACF to determine whether there is idle transport resource available which meets the requirements in the network, and makes admission decision according to determination results.

A-RACF, which receives the resource request from the SPDF, determines whether there is idle transport resource available which meets the requirements in the network, and controls QoS guarantee related forward action of access transport equipment.

Core network Border Gateway Function (C-BGF), which receives, stores, and enforces admission decision parameters from resource and admission control layer, and further performs message filtering, traffic classification, labeling, monitoring and trimming according to the parameters, and yet possibly performs network address conversion and security check filter of messages.

In this draft, the descriptions of functions and interface requirements are also developed around proxy request mode. However, complete interface requirements and relevant workflows are not provided either. Therefore, no corresponding detailed solution is provided for resource reservation in customer request mode.

SUMMARY OF THE INVENTION

Embodiments of the invention provide a resource reservation method in customer request mode in NGN, and an NGN RACS supporting resource reservation in customer request mode, and an RM-PDF thereof.

A method for resource reservation in customer request mode in an NGN includes:

an RM-PDF receives a resource request containing resource request parameters through a BGF;

The RM-PDF sends an admission installation instruction to the BGF to set admission decision parameters in the BGF for implementing resource reservation when the resource request complies with a customer configuration and network operation policy rules and there is available resource required by the resource request in a transmission network.

An NGN RACS includes a BGF which receives a resource request containing resource request parameters and sends out the resource request, and receives a admission installation instruction and sets admission decision parameters according to the admission installation instruction for implementing resource reservation;

an RM-PDF which receives the resource request from the BGF, sends the admission installation instruction to the BGF when the resource request complies with a customer configuration and network operation policy rules and there is available resource required by the resource request in a transmission network.

An RM-PDF includes: a first unit, receiving a message from a piece of CPE or an AF; a second unit, determining whether the message complies with a customer configuration file and network operation policy rules and whether there is available resource required by the message in a transmission network; a third unit, sending to a BGF instructions for setting parameters for implementing resource reservation according to a determination result of the second unit.

It can be seen from the above technical solution provided by embodiments of the invention that an NGN RACS is enabled to allow a piece of CPE to directly initiate resource reservation, resource modification and resource release to the network through dedicated signaling. Furthermore, embodiments of the invention support services such as media flow re-negotiation and call waiting during a multimedia session, etc.

Therefore embodiments of the invention realize resource reservation in NGN customer request mode and provide an easy method for resource reservation in customer request mode.

DETAILED DESCRIPTION OF THE PREFERRED EMBODIMENTS

The invention is further described in details hereinafter with reference to accompanying drawings and embodiments.

An embodiment of the invention provides a method for an NGN RACS to support resource reservation in customer request mode.

The customer request mode includes a process of initiating a resource request directly by a piece of CPE to a network through dedicated path coupled signaling; the resource request can be initiated in connection with a session or be independent of session; resource request may be authorized in advance or unauthorized by a piece of service control equipment.

The RACS function framework of ETSI TISPAN corresponds to, and is a compatible subsystem of, the access part of the RACS framework of ITU-T FGNGN, so the description of the embodiment of the invention is based oil the RACS framework of ITU-T FGNGN shown in FIG. 1. Obviously, the method provided by the embodiment of the invention is also applicable to the RACS framework of ETSI TISPAN.

Figure 3:
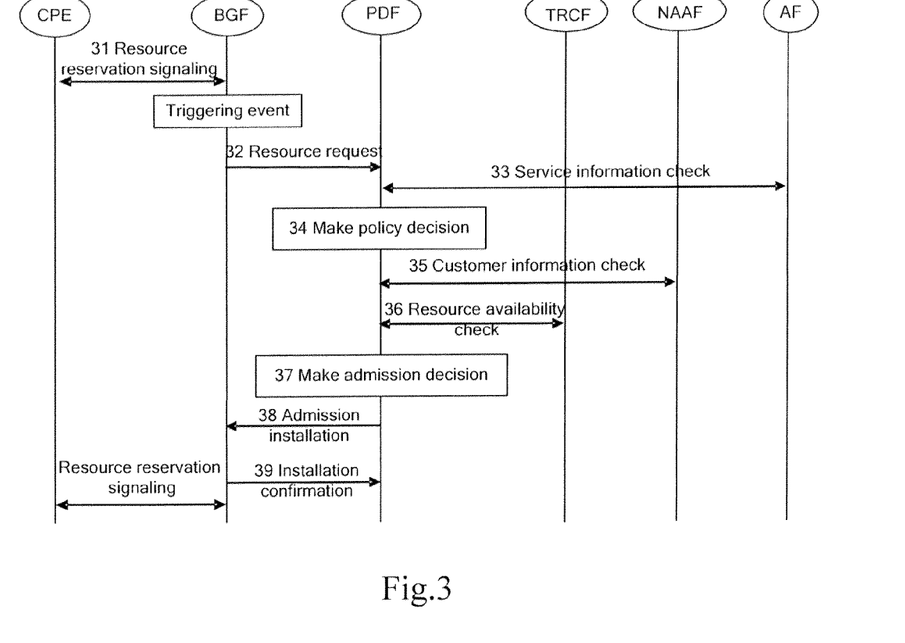
FIG. 3 is a process flowchart in which a resource reservation request initiated by a customer is handled in accordance with an embodiment of the invention.

FIG. 3 shows the implementation of the method for resource reservation in NGN in customer request mode in accordance with the embodiment of the invention. As shown in FIG. 3, the processes performed by an NGN RACS to handle a resource request initiated by a customer comprise the following steps.

Step 31: a piece of CPE directly initiates a resource request to a network through a dedicated path coupled signaling, i.e., the piece of CPE sends a resource reservation signaling, which is also called resource request signaling, to a BGF to request for resource.

The path coupled signaling means that the resource request signaling messages are transmitted through the same path as the data traffic, e.g., Packet Data Protocol (PDP) Context messages containing Universal Mobile Telecommunication System (UMTS) QoS parameters defined by 3GPP, Resource Reservation Protocol (RSVP) defined and Next Steps in Signaling (NSIS) protocol being defined by the Internet Engineering Task Force (IETF).

Access network transport equipment (including access nodes, aggregation nodes and edge nodes) transmit the resource request signaling transparently and send the signaling to the BGF at the edge of the core network; the BGF processes the resource request signaling and extracts the resource request.

The resource request signaling contains the reservation parameters of the resource needed by a customer terminal, which includes customer traffic identification information (e.g., an IP 5-tuple message), a bandwidth requirement parameter and a QoS requirement parameter, etc.

Step 32: the BGF sends a resource request to an RM-PDF.

Transport equipment in the core network transmit the resource request signaling transparently, and if the customer resource request signaling is transmitted in a periodic refresh mode, the BGF should be able to filter out repeated resource request signalings.

The resource request also contains information including the customer traffic identification information (IP 5-tuple), the parameter of bandwidth needed and the parameter of QoS needed.

When the PDF receives the resource request, if the resource request relates to a session, Step 33 is performed, otherwise Step 34 is performed.

Step 33: the PDF sends a service information request to an AF to carry out a service information check, and the AF returns the current session description information to the RM-PDF.

The session description information includes the information negotiated by the communicating terminals, such as session address, media stream type, QoS requirement, service priority level, etc.

Obviously, when the resource request from the customer does not relate to any session, the RM-PDF does not need to send a service information request to the AF.

Figure 4:
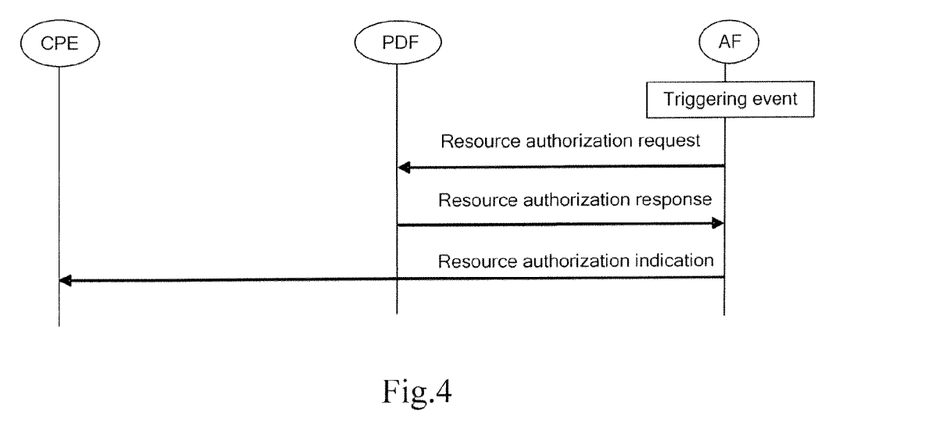
FIG. 4 is a process flowchart in which an AF requests for authorization to an RM-PDF in advance in accordance with an embodiment of the invention.

The method through which the PDF determines whether the request relates to a session comprises the steps of: determining whether the AF has requested for authorization to the RM-PDF before the customer transmits the resource request, and if the AF has requested for authorization, determining that the resource request from the customer relates to a session. The process of the authorization is shown in FIG. 4.

Step 34: the RM-PDF makes a policy decision for the request according to the network operation policy rules stored in a local or remote device, so as to determine whether the resource request should be accepted, and the RM-PDF continues with the follow-up processes if the request is accepted; otherwise the resource request is rejected directly.

Step 35: the RM-PDF interacts with an NAAF maintaining customer information, to check the customer information including QoS related customer configuration and authorization information.

Step 36: after finishing customer information check, the RM-PDF proceeds to resource availability check.

The RM-PDF carries out corresponding resource availability check to the TRCFs.

When the RM-PDF interacts with the TRCFs for network performance control, to carry out transport resource availability check, the RM-PDF first selects corresponding TRCFs in the access network and core network on the resource path based on the resource request, then forwards the resource request to corresponding TRCFs which carry out internal resource availability check in the network and return the resource availability check result to the RM-PDF.

The TRCFs may also detect the status and configure the parameters of the route and forwarding of network transport equipment so as to control and ensure network performance.

Step 37: the PDF makes a decision related to resource reservation, namely an admission decision.

That is, upon receiving the resource request from the BGF, the RM-PDF makes an admission decision according to the network operation policy rules, customer configuration and resource availability check result.

Step 38: when the BGF receives the admission installation instruction returned by the RM-PDF, the BGF installs the admission decision locally and processes the data traffic according to the admission decision.

The admission decision comprises admission decision parameters, including the customer identification information (e.g., IP 5-tuple), bandwidth requirement and priority level, etc.

The BGF needs to store the admission decision parameters to control the service traffic forwarding of the corresponding customer, that is, the BGF forwards incoming customer traffic according to the admission decision parameters set in the BGF.

Step 39: the BGF returns an installation confirmation message to the RM-PDF.

If the resource reservation relates to a session, the RM-PDF may also be triggered to send a confirmation message to the AF.

In the embodiment of the invention, the BGF may process the resource request signaling report in a termination mode, or a snooping mode, or a proxy mode.

Figure 5:
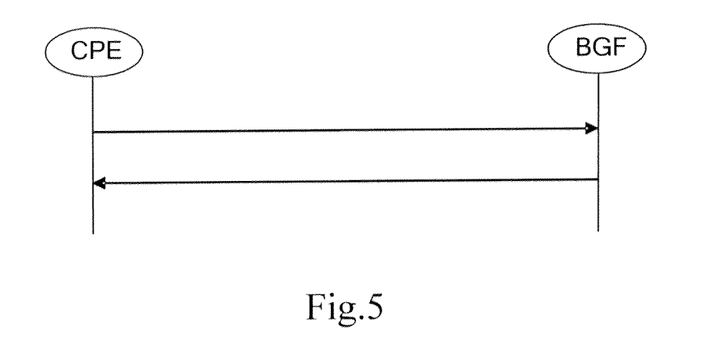
FIG. 5 is a schematic illustrating the method through which a BGF handles a customer resource request signaling in termination mode in accordance with an embodiment of the invention.

As shown in FIG. 5, when the termination mode is used to process the resource request signaling report, the BGF directly responses a confirmation message upon receiving the resource request signaling report, and then performs the follow-up resource request process.

Figure 6:
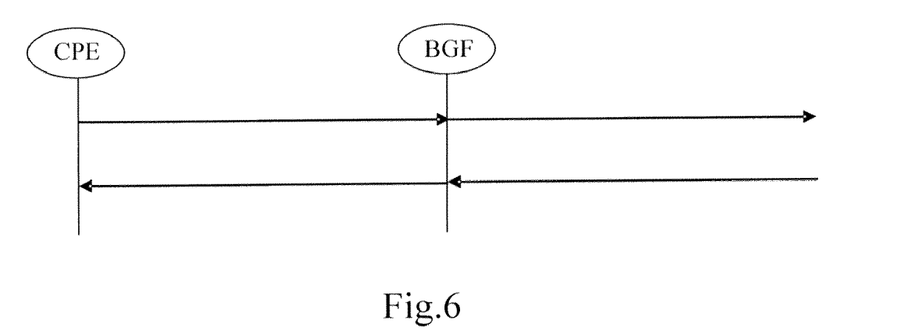
FIG. 6 is a schematic illustrating the method through which a BGF handles a customer resource request signaling in snooping mode in accordance with an embodiment of the invention.

As shown in FIG. 6, when the snooping mode is used to process the resource request signaling report, upon receiving the resource request signaling report, the BGF transmits the resource request signaling report transparently to the network equipment of the next level to perform corresponding resource request process, and directly transmits the resource request response to the CPE transparently.

Figure 7:
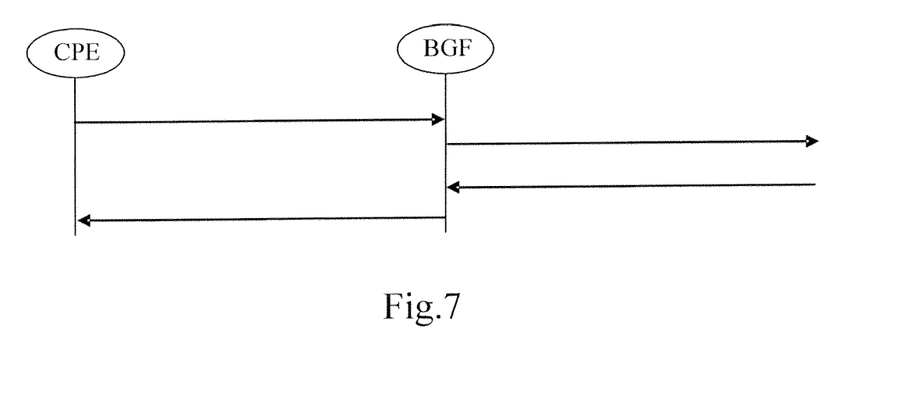
FIG. 7 is a schematic illustrating the method through which a BGF handles a customer resource request signaling in proxy mode in accordance with an embodiment of the invention.

As shown in FIG. 7, when the proxy mode is used to process the resource request signaling report upon receiving the resource request signaling report the BGF; initiates a resource request to the RM-PDF according to the signaling report, and upon receiving the resource request response returned, sends a resource request confirmation message to the CPE.

In the proxy mode, the BGF may modify, aggregate or de-aggregate resource request signaling messages before communicating with the RM-PDF to carry out corresponding resource request process.

Figure 8:
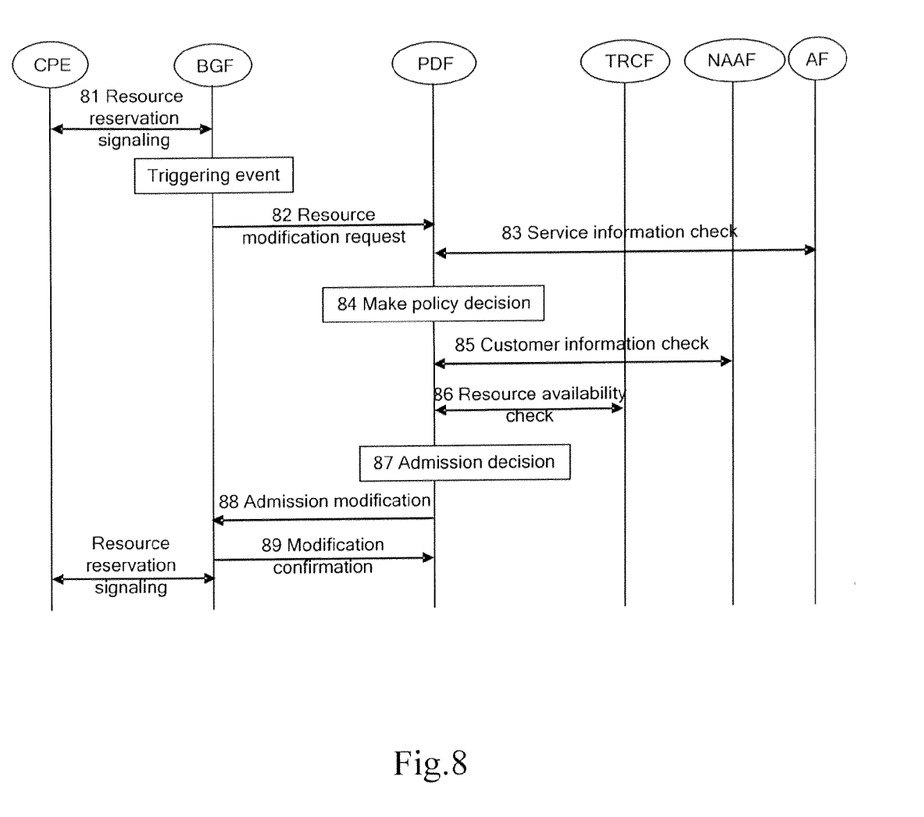
FIG. 8 is a process flowchart in which a resource reservation modification request initiated by a customer is handled in accordance with an embodiment of the invention.

In the embodiment of the invention, the customer may initiate an admission decision modification during a session to modify address, bandwidth and QoS level, etc. The CPE directly initiates a resource modification request to the network through dedicated path coupled signaling, and the processes performed by an NGN RACS to handle a resource modification request is shown in FIG. 8 the processes include the following steps.

Step 81: a CPE sends a resource reservation signaling, which is also called resource modification signaling, to a BGF to modify admission decision parameters.

Step 82: the BGF determines that the admission decision parameters need to be modified and sends a resource modification request to an RM-PDF.

When the RM-PDF receives the resource modification request, if corresponding parameters in the resource modification request relate to a session, Step 83 will be performed; otherwise Step 84 will be performed directly.

Step 83: the RM-PDF initiates a service information check to an AF which returns the current session description information to the RM-PDF.

Step 84: the RM-PDF makes a policy decision according to the network operation policy rules stored locally or in a remote device so as to determine whether to accept the resource modification request.

If the request is accepted, Step 84 and the follow-up processes will be performed; otherwise the request is rejected directly.

Step 85: the RM-PDF also needs to initiates a customer information check to an NAAF, and Step 86 is performed after the customer information check result is obtained.

Step 86: the RM-PDF carries out a resource availability check, which is actually performed by a TRCF, to obtain a resource availability check result.

Step 87: makes a decision related to resource reservation, namely an admission decision.

That is, upon receiving the resource modification request from the BGF, the RM-PDF makes an admission decision according to the network operation policy rules, customer configuration and resource availability check result.

Step 88: send an admission modification instruction to the BGF according to the admission decision, and the BGF modifies corresponding admission decision parameters stored in the BGF upon receiving the admission modification instruction.

The modification instruction contains admission decision parameters which have been modified.

Step 89: the BGF returns a modification confirmation message to the RM-PDF after finishing the modification of corresponding admission decision parameters.

Figure 9:
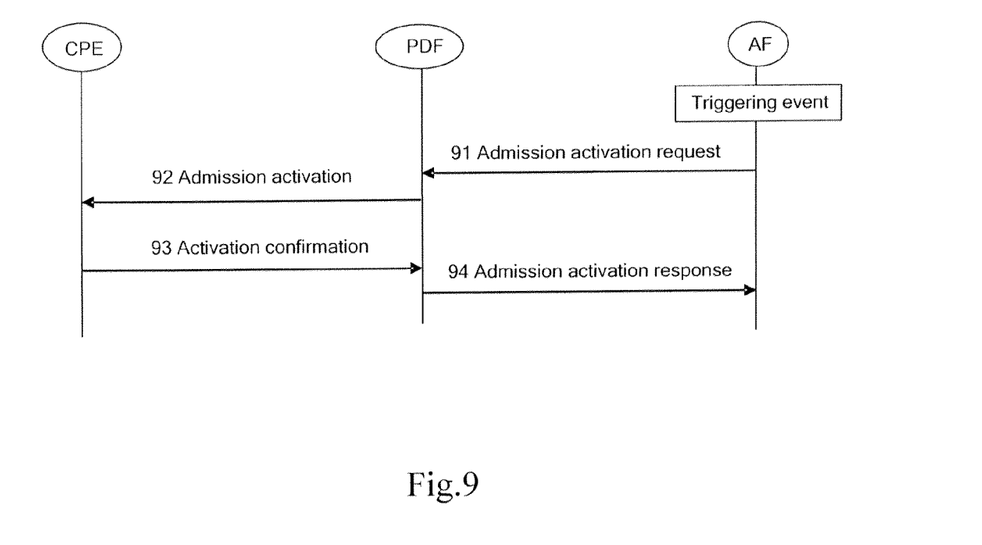
FIG. 9 is a process flowchart in which an admission activation request initiated by an AF is handled in accordance with an embodiment of the invention.

In the embodiment of the invention, during the re-negotiation of a media stream in a multimedia session, and while handling a service such as call wait service, the NGN RACS allows an AF to initiate an admission activation request directly and enables a BGF to perform an admission decision about authorized resources made by the RM-PDF through an RM-PDF request. FIG. 9 shows the process through which the NGN RACS handles an admission activation request initiated by the AF, and the process includes the following steps.

Step 91: after ascertaining the occurrence of an event in which corresponding admission decision parameters need to be activated, the AF sends an admission activation request to an PM-PDF.

The admission activation request should contain the admission decision parameters that need to be activated or the identification information of the parameters that need to be activated.

Step 92: upon receiving the admission activation request, the RM-PDF sends an admission activation instruction to a BGF.

The admission activation instruction contains the admission decision parameters that need to be activated or the identification information of the parameters so that the BGF may determine the admission decision parameters to be activated.

Step 93: upon receiving the admission activation instruction, the BGF performs the corresponding activation process and returns an activation confirmation message to the RM-PDF.

When the activation of corresponding admission decision parameters is confirmed, corresponding service traffic can be controlled according to the admission decision parameters.

Step 94: upon receiving the activation confirmation message, the RM-PDF returns an activation response to the AF, and notifies the AF of the activation result of corresponding admission decision parameters.

Figure 10:
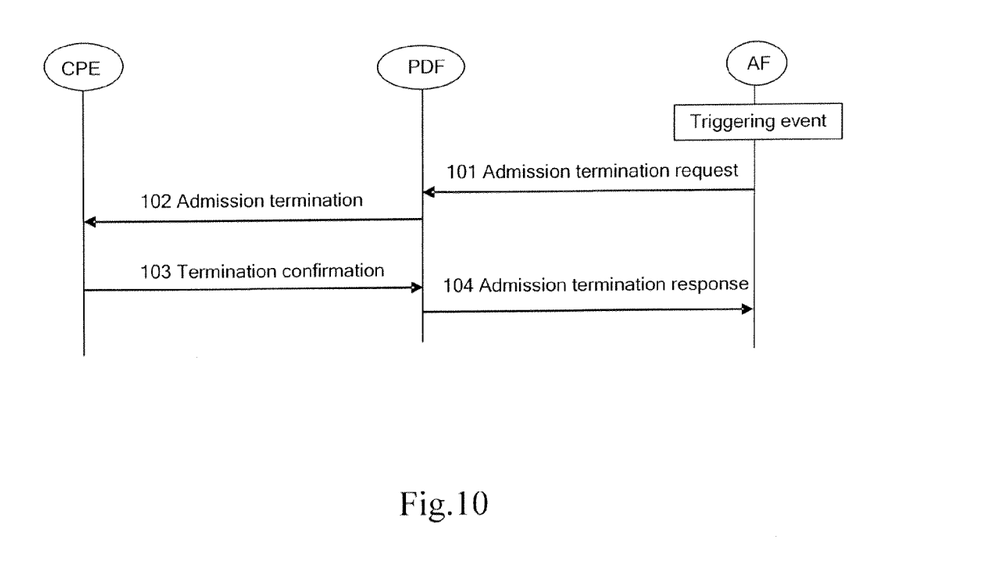
FIG. 10 is a process flowchart in which an admission termination request initiated by an AF is handled in accordance with an embodiment of the invention.

In the embodiment of the invention, during the re-negotiation of a media stream in a multimedia session, and while handling a service such as call wait service, the NGN RACS allows an AF to initiate an admission termination request directly and enables a BGF to stop performing the admission decision made by the RM-PDF about authorized resources through an RM-PDF request. FIG. 10 shows the process through which the NGN RACS handles an admission termination request initiated by the AF, and the process includes the following steps.

Step 101: after ascertaining the occurrence of an event in which corresponding admission decision parameters need to be terminated, an AF sends an admission termination request to an RM-PDF.

The admission activation request should contain the admission decision parameters which need to be terminated or the identification information of the parameters.

Step 102: upon receiving the admission termination request, the RM-PDF sends an admission termination instruction to a BGF.

The admission termination instruction contains the admission decision parameters which need to be terminated or the identification information of the parameters so that the BGF may determine the admission decision parameters to be terminated.

Step 103: upon receiving the admission termination instruction, the BGF performs corresponding termination process and returns a termination confirmation message to the RM-PDF.

After being terminated, corresponding admission decision parameters no longer serve as the foundation of corresponding service traffic control.

Step 104: upon receiving the termination confirmation message, the RM-PDF returns a termination response to the AF, notifying the AF of the termination result of corresponding admission decision parameters.

Figure 11:
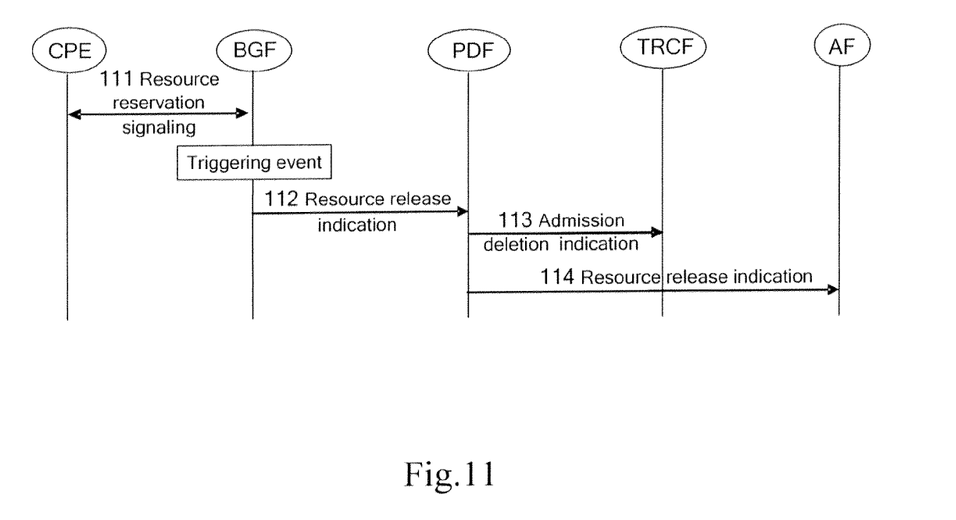
FIG. 11 is a process flowchart in which a resource release request initiated by a customer is handled in accordance with an embodiment of the invention.

In the embodiment of the invention, a customer may initiate resource reservation release during a session to support the media stream variation in a multimedia session. A CPE may directly initiate a resource release request through a dedicated path coupled signaling to the network, and the process performed by an NGN RACS to handle a resource release request is shown in FIG. 11, and the process includes the following steps.

Step 111: the CPE transmits a resource reservation instruction corresponding to a resource release request.

The instruction contains the admission decision parameters that need to be released or the identification information of the parameters so that the BGF may determine the admission decision parameters to be released.

Step 112: upon receiving the resource reservation instruction, the BGF deletes or terminates corresponding admission decision parameters and sends a resource release indication to an RM-PDF.

Step 113: upon receiving the resource release indication, the PDF sends an admission deletion indication message to a TRCF so that the TRCF can modify the resource allocation stored in the TRCF itself.

Step 114: upon receiving the resource release indication, the PDF also needs to send a resource release indication to an AF, notifying the AF that corresponding resource reservation is released so that the AF may release corresponding session.

Figure 12:
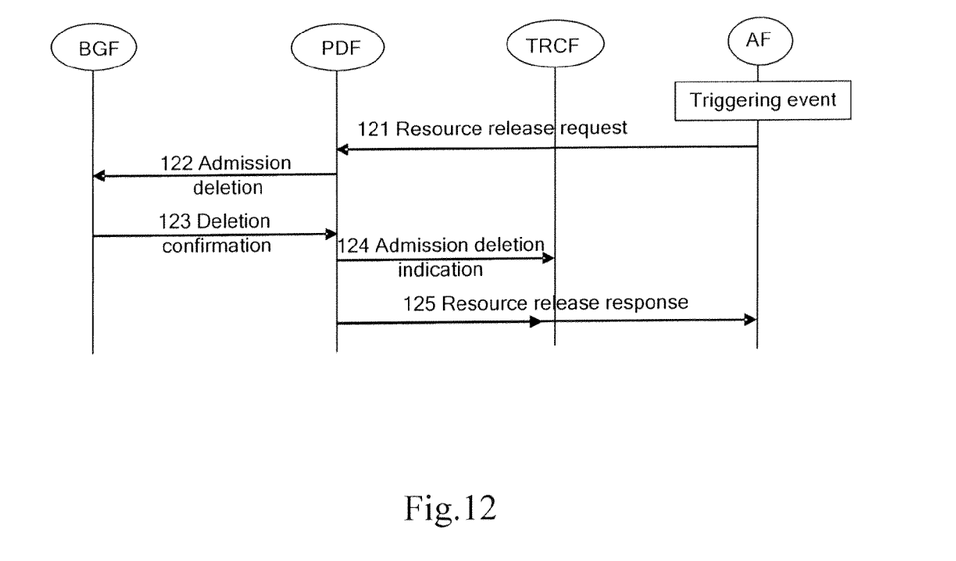
FIG. 12 is a process flowchart in which a resource release request initiated by an AF is handled in accordance with an embodiment of the invention.

In the embodiment of the invention, when the AF releases a session, the AF should initiates a resource release request to the RM-PDF to release the resources occupied by all the media streams of the session. FIG. 12 shows the process through which an NGN RACS handles a resource release request initiated by an AF, and the process includes the following steps.

Step 121: when the AF has released a corresponding session, the AF has to send a resource release request to an RM-PDF.

The resource release request contains the admission decision parameters that need to be released or the identification information of the parameters so that the admission decision parameters to be released (deleted) can be determined.

Step 122: upon receiving the resource release request, the RM-PDF sends an admission deletion or termination instruction to a BGF.

The instruction contains the admission decision parameters that need to be deleted or terminated or the identification information of the parameters.

Step 123: the BGF performs corresponding deletion or termination to corresponding admission decision parameters and returns a deletion or termination confirmation message to the RM-PDF.

Step 124: upon receiving the confirmation message, the RM-PDF needs to send an admission deletion indication message to a TRCF so that the TRCF may release corresponding allocated resource information.

Step 125: then the RM-PDF needs to send a resource release response to the AF.

Figure 13:
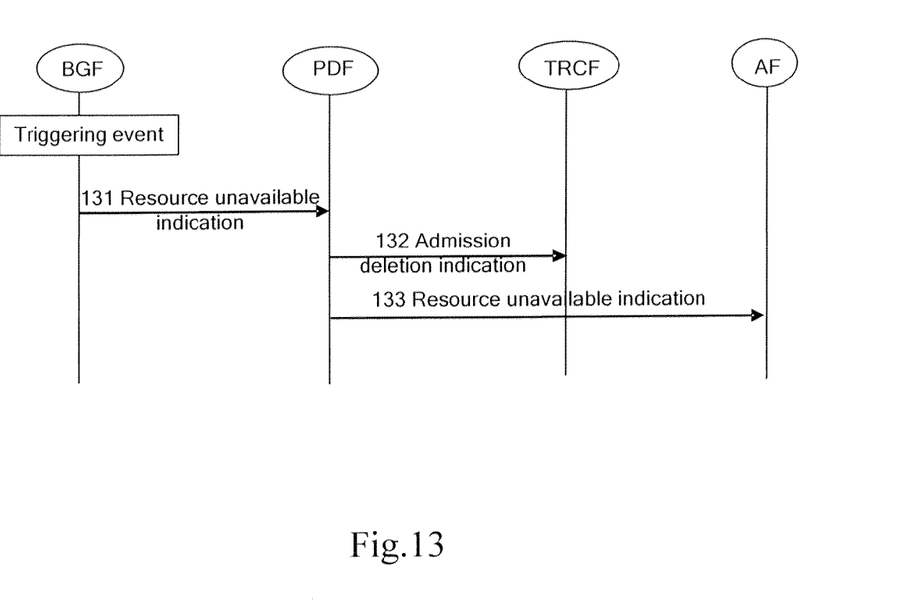
FIG. 13 is a process flowchart in which a resource unavailable indication reported by a BGF is handled in accordance with an embodiment of the invention.

In the embodiment of the invention, when a BGF fails to provide bandwidth resource for an authorized resource reservation due to interface malfunction during a session, the BGF should initiatively send a resource unavailable indication to the RM-PDF, and if the resource reservation relates to a session, this may trigger the PDF to send a resource unavailable indication to the AF. FIG. 13 shows the corresponding handling process, and the process includes the following steps.

Step 131: when a BGF determines that resource is unavailable, it deletes or terminates corresponding admission decision parameters and sends a resource unavailable indication to an RM-PDF.

Step 132: upon receiving the resource unavailable indication, the RM-PDF sends a resource deletion indication to a TRCF so that the TRCF may modify the allocated resource information stored.

Step 133: upon receiving the resource unavailable indication, the RM-PDF also needs to send a resource deletion indication to an AF so that the AF may release corresponding session.

Figure 14:
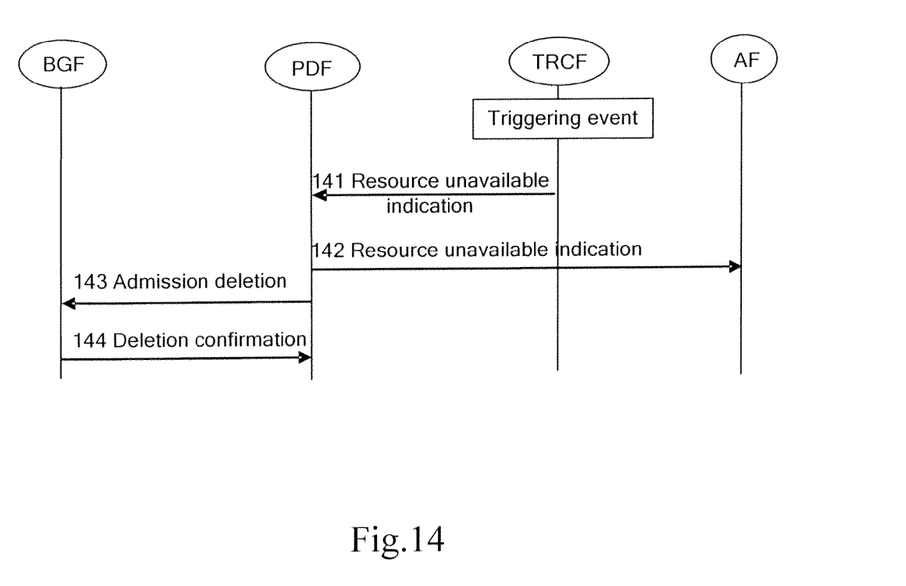
FIG. 14 is a process flowchart in which a resource unavailable indication reported by a TRCF is handled in accordance with an embodiment of the invention.

In the embodiment of the invention, when a TRCF detects that no bandwidth resource can be provided for an authorized resource reservation due to internal malfunction in a network during a session, the TRCF should initiatively send a resource unavailable indication to the RM-PDF; and if the resource reservation relates to a session, this may trigger the PDF to send a resource unavailable indication to the AF. FIG. 14 shows the corresponding handling process, and the process includes the following steps.

Step 141: when a TRCF determines that resource is unavailable, the TRCF sends a resource unavailable indication to an RM-PDF.

Step 142: upon receiving the resource unavailable indication, the RM-PDF sends a resource unavailable indication to the AF.

Step 143: upon receiving the resource unavailable indication, the RM-PDF also sends an admission deletion or termination instruction to a BGF.

Step 144: the BGF deletes or terminates corresponding admission decision parameters and returns a deletion or termination confirmation message to the RM-PDF.

To sum up, the embodiment of the invention enables an NGN RACS to allow CPE to initiate resource reservation, resource modification and resource release directly to a network through dedicated signaling; therefore resource reservation in customer request mode is realized.

The foregoing is only embodiments of this invention. The protection scope of this invention, however, is not limited to the above description. Any change or substitution, within the technical scope disclosed by this invention, easily occurring to those skilled in the art should be covered in the protection scope of this invention. Therefore, the protection scope of the invention should be determined according to claims.

What is claimed is:

1. A method for resource reservation in customer request mode in a Next Generation Network (NGN) comprising:
receiving, by a Resource Mediation Policy Decision Function (RM-PDF), a resource request containing resource request parameters through a Border Gateway Function (BGF);
sending, by the RM-PDF, an admission installation instruction to the BGF to set admission decision parameters in the BGF for implementing resource reservation when the resource request complies with a customer configuration and network operation policy rules and there is available resource required by the resource request in a transmission network;
receiving, by the RM-PDF, a resource modification request containing the resource request parameters modified through the BGF; and
sending, by the RM-PDF, an admission modification instruction to the BGF to modify the admission decision parameters corresponding to the resource request parameters modified through the BGF for implementing resource reservation when the resource modification request complies with the customer configuration and the network operation policy rules and there is available resource required by the resource modification request in the transmission network.

2. The method of claim 1, further comprising:
processing, by the BGF, the resource request in one of the following modes: a termination mode, a snooping mode, and a proxy mode,
wherein processing, by the BGF, the resource request in the termination mode comprises: responding, by the BGF, a confirmation message directly upon receiving the resource request,
wherein processing, by the BGF, the resource request in the snooping mode comprises transmitting, by the BGF, the resource request transparently to a network equipment of the next level upon receiving the resource request, and directly transmits the resource request response to a customer premise equipment (CPE) transparently, and
wherein processing, by the BGF, the resource request in the proxy mode comprises: initiating, by the BGF, a resource request to the RM-PDF upon receiving the resource request, and sending a resource request confirmation message to the CPE upon receiving a resource request response.

3. The method of claim 1, further comprising:
upon receiving the resource request and if the request corresponds to a session, interacting, by the RM-PDF, with an Application Function (AF) to obtain a description of the session.

4. The method of claim 3, further comprising:
determining that the resource request relates to the session, if the AF has requested for authorization to the RM-PDF before the resource request is send out.

5. The method of claim 1, further comprising:
obtaining, by the RM-PDF, the network operation policy rules from a local or remote entity upon receiving the resource request.

6. The method of claim 1, further comprising:
interacting, by the RM-PDF, with a Transport Resource Control Function (TRCF) to carry out a resource availability check upon receiving the resource request.

7. The method of claim 1, further comprising:
sending, by an AF, to the RM-PDF an admission activation or termination message containing parameters related to resource reservation that needs to be activated or terminated or the identification information thereof;
sending, by the RM-PDF, to the BGF an admission activation or termination instruction containing the parameters related to resource reservation that needs to be activated or terminated, or the identification information of the parameters upon receiving the admission activation or termination message; and
activating, or terminating the parameters related to resource reservation by the BGF upon receiving the admission activation or termination instruction.

8. The method of claim 1, further comprising:
receiving, by the RM-PDF, a resource release message containing resource request parameters that need to be released or the identification information thereof through the BGF;
sending, by the RM-PDF, an admission deletion indication to a TRCF and a resource release indication to an AF related to a session, wherein both of the indications contain resource request parameters that need to be released or the identification information thereof; and
modifying, by the TRCF, corresponding resource allocation information upon receiving the admission deletion indication, and releasing corresponding session by the AF upon receiving the resource release indication.

9. The method of claim 1, further comprising:
sending, by an AF, to the RM-PDF a resource release request containing information related to admission decision parameters that need to be released, or the identification information thereof;
sending, by the RM-PDF, to the BGF an admission deletion instruction or termination instruction containing the admission decision parameters that need to be released or the identification information thereof; and
deleting or terminating the admission decision parameters that need to be released by the BGF.

10. The method of claim 9, wherein the process of deleting or terminating the admission decision parameters further comprises:
returning, by the BGF, a confirmation message to the RM-PDF after the admission decision parameters that need to be released are deleted or terminated;
sending, by the RM-PDF, an admission deletion indication message containing the resource request parameters that need to be released or the identification information thereof to a TRCF upon receiving the confirmation message; and
modifying, by the TRCF, resource allocation information stored upon receiving the admission deletion indication message.

11. The method of claim 10, wherein the process of sending an admission deletion indication message further comprises:
sending, by the RM-PDF, a resource release response to the AF upon receiving the confirmation message.

12. The method of claim 1, further comprising:
initiating, by the BGF, a resource unavailable indication to the RM-PDF when the BGF fails to provide a bandwidth resource for an authorized resource reservation due to interface malfunction during a session;
sending, by the RM-PDF, an admission deletion indication message to a TRCF and a resource release indication to an AF related to a session upon receiving the resource unavailable indication; and
modifying, by the TRCF, resource allocation information stored upon receiving the admission deletion indication, and releasing the session by the AF upon receiving the resource release indication.

13. The method of claim 1, further comprising:
initiating, by a TRCF, a resource unavailable indication to the RM-PDF when the TRCF detects that no bandwidth resource can be provided for an authorized resource reservation due to internal malfunction in a network during a session;
sending, by the RM-PDF, the resource unavailable indication to the AF and an admission deletion or termination instruction to the BGF upon receiving the resource unavailable indication; and
releasing, by the AF, a session upon receiving the resource unavailable indication, and deleting, or terminating by the BGF the admission decision parameters upon receiving the admission deletion or termination instruction.

14. The method of claim 1, further comprising:
returning, by the BGF, a confirmation message to the RM-PDF after the BGF has determined the admission decision parameters, and sending a response to an AF by the RM-PDF; and
forwarding, by the BGF, an incoming customer traffic in the NGN network according to the admission decision parameters.

15. The method of claim 1, further comprising:
storing the admission decision parameters in the BGF.

16. A Next Generation Network (NGN) Resource and Admission Control System (RACS), comprising:
a Border Gateway Function (BGF) receives a resource request containing resource request parameters, sends out the resource request, receives an admission installation instruction, and sets admission decision parameters according to the admission installation instruction for implementing resource reservation; and
a Resource Mediation Policy Decision Function (RM-PDF) receives the resource request from the BGF and sends the admission installation instruction to the BGF when the resource request complies with a customer configuration and network operation policy rules and there is available resource required by the resource request in a transmission network,
wherein the RM-PDF receives a resource modification request containing resource request parameters modified through the BGF, sends an admission modification instruction to the BGF to modify the admission decision parameters corresponding to the resource request parameters modified in the BGF for implementing resource reservation when the resource modification request complies with the customer configuration and network operation policy rules and there is available resource required by the resource modification request in the transmission network.

17. The RACS of claim 16, wherein the BGF is further configured to forward the incoming customer traffic in the NGN network according to the admission decision parameters.

18. The RACS of claim 17, wherein the RM-PDF is further configured to receive a resource modification request, and modify the admission decision parameters.

19. The RACS of claim 17 further comprising:
an Application function (AF), configured to send an admission activation or termination message containing the admission decision parameters that need to be activated or terminated to the RM-PDF;
wherein the RM-PDF is further configured to activate or terminate the admission decision parameters that need to be activated or terminated in the BGF upon receiving the admission activation or termination message.

20. The RAGS of claim 18, further comprising:
a Transport Resource Control Functions (TRCF), configured to modify corresponding resource allocation information upon receiving a admission deletion indication message; and
a piece of Customer Premise Equipment (CPE) is configured to send a resource release message to the RM-PDF through the BGF, and send an admission deletion indication to the TRCF and a resource release indication to an AF related to session;
wherein the AF related to session is configured to release corresponding session upon receiving the resource release indication message.

21. A system having a Resource Mediation Policy Decision Function (RM-PDF), the system comprising:
a first unit receives a message from a piece of Customer Premise Equipment (CPE) or an Application Function (AF);
a second unit determines whether the message complies with a customer configuration file and network operation policy rules and whether there is available resource required by the message in a transmission network;
a third unit sends to a Border Gateway Function (BGF) instructions for setting parameters for implementing resource reservation according to a determination result of the second unit;
a fourth unit receives a resource modification request containing resource request parameters modified through the BGF; and
a fifth unit sends an admission modification instruction to the BGF to modify the admission decision parameters corresponding to the resource request parameters modified in the BGF for implementing resource reservation when the resource modification request complies with the customer configuration and network operation policy rules and there is available resource required by the resource modification request in the transmission network.

* * * * *

UNITED STATES PATENT AND TRADEMARK OFFICE
CERTIFICATE OF CORRECTION

PATENT NO. : 7,602,711 B2  
APPLICATION NO. : 11/681641  
DATED : October 13, 2009  
INVENTOR(S) : Enhui Liu Page 1 of 1

It is certified that error appears in the above-identified patent and that said Letters Patent is hereby corrected as shown below:

On The Title Page, Item (30), (30)      Foreign Application Priority Data  
       Mar. 8, 2005    (CN) ................ 2005 1 005 3506  
       Jul. 5, 2006    (KR) ................ 10-2006-0063134 should be corrected as:

(30)      Foreign Application Priority Data  
       Mar. 8, 2005    (CN) ................ 2005 1 005 3506

Signed and Sealed this  
Twelfth Day of July, 2016

Michelle K. Lee  
*Director of the United States Patent and Trademark Office*